United States Patent [19]
Satterthwaite

[11] Patent Number: 5,786,882
[45] Date of Patent: Jul. 28, 1998

[54] RETAINER FOR SPECTACLES

[76] Inventor: Richard W. Satterthwaite, 2014 Charles St., Fredericksburg, Va. 22401-3417

[21] Appl. No.: 878,204

[22] Filed: Jun. 18, 1997

[51] Int. Cl.$^6$ .................................................. G02C 3/00
[52] U.S. Cl. .................................................. 351/156; 351/157
[58] Field of Search .................................. 351/156, 157; 2/452; 24/3 C

[56] References Cited

U.S. PATENT DOCUMENTS

| | | | |
|---|---|---|---|
| 2,819,650 | 1/1958 | Seron | 351/157 |
| 2,914,769 | 12/1959 | Anderson | 351/157 |
| 3,582,194 | 6/1971 | Liautaud | 351/156 |
| 3,728,159 | 4/1973 | Downey | 351/157 |
| 4,603,951 | 8/1986 | Beck et al. | 351/156 |
| 5,475,449 | 12/1995 | Pyle | 351/157 |

*Primary Examiner*—Huy Mai
*Attorney, Agent, or Firm*—Donald W. Marks

[57] ABSTRACT

A retainer for spectacles has slots formed horizontally from front edges in flat plastic depending rear ends or tips of temples hinged on opposite sides of a double eyeglass frame for receiving and retaining opposite end portions of an elastic band extending around the backside of the user's head to retain the spectacles on the user's head. The slots have forward portions with reduced width relative to thickness of the elastic bands and the width of rear portions of the slots so as to retain the elastic bands within the slots. The rear portions of the slots are beveled so as to reduce wear on the elastic band as well as to enhance the retaining of the band within the rear portions of the slots as well as rendering the band less visible.

10 Claims, 3 Drawing Sheets

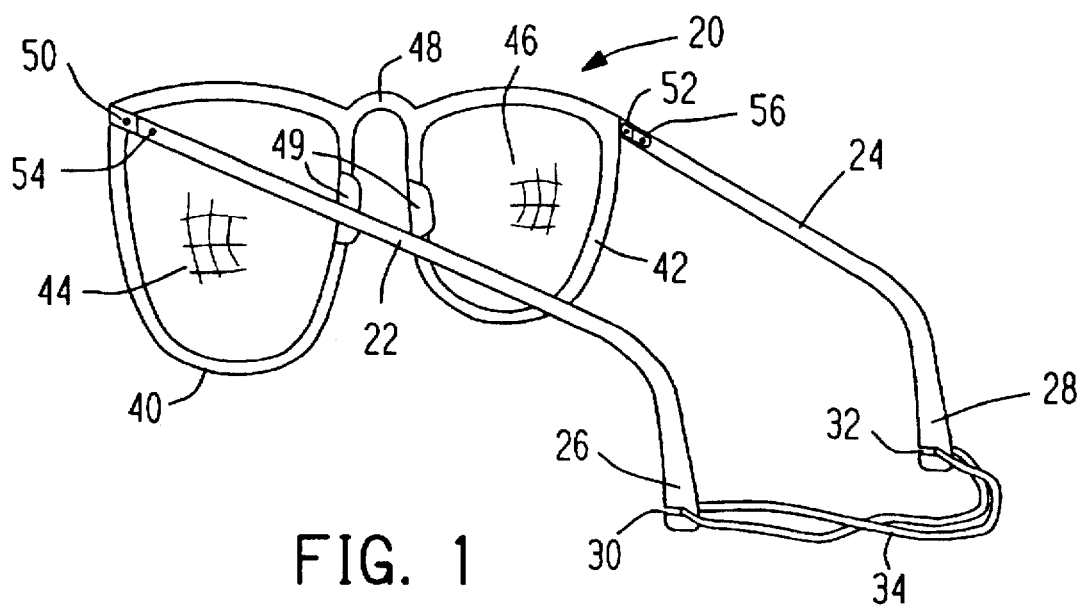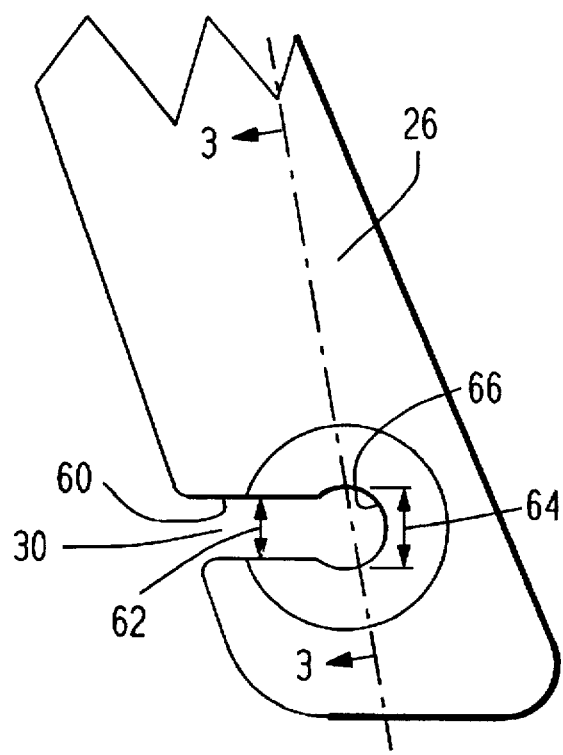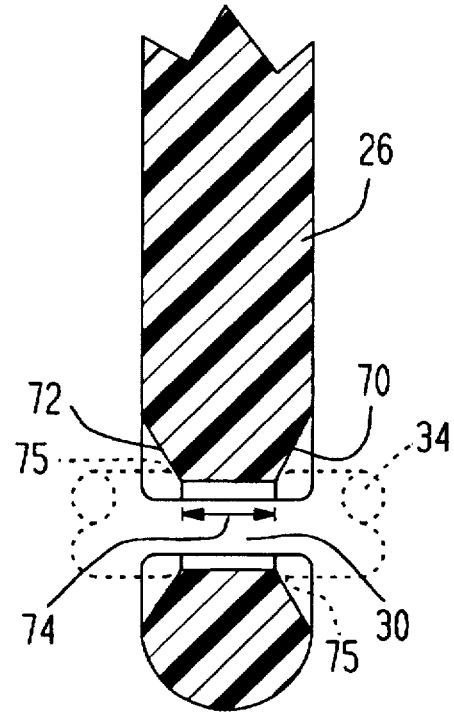

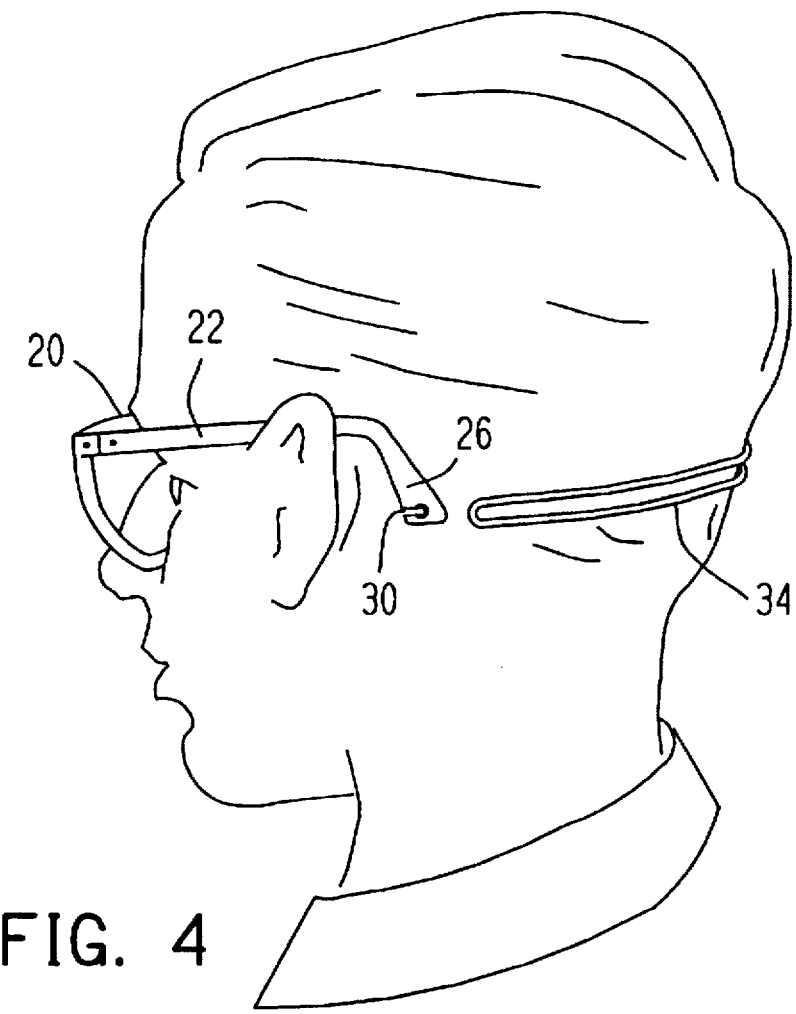
FIG. 4
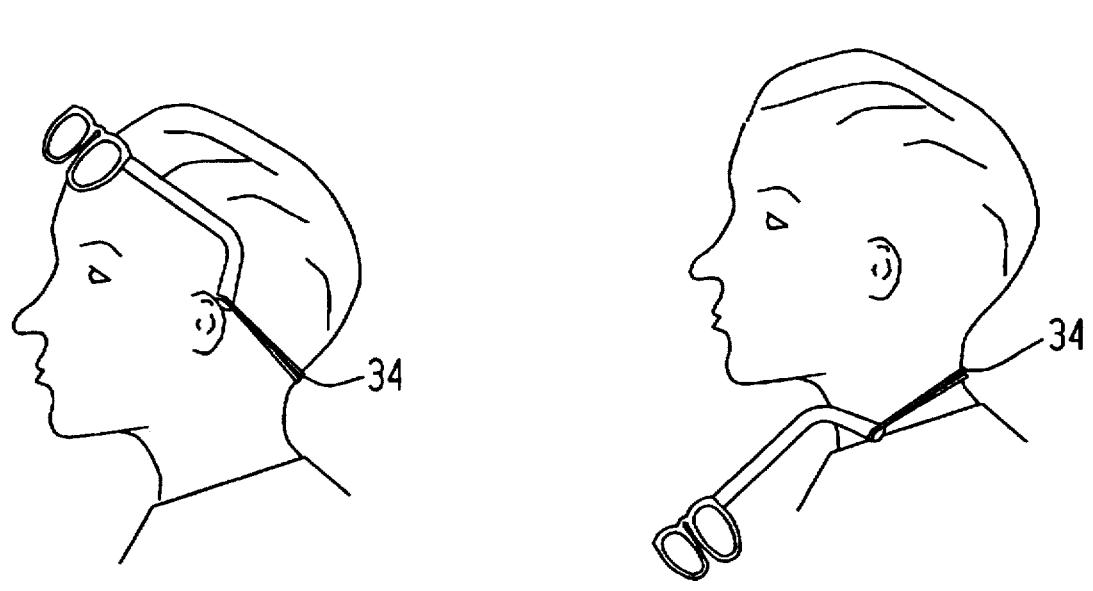
FIG. 5
FIG. 6

5,786,882

1
RETAINER FOR SPECTACLES

TECHNICAL FIELD

The present invention relates to a retainer for comfortably holding spectacles on a head of a user, and particularly to an arrangement for retaining an elastic band on the rear ends of temples of spectacles to extend around the back of the head.

BACKGROUND ART

Spectacles formed from a double eyeglass frame and a pair of temples hinged on respective opposite sides of the frame generally have flat plastic tips which depend or extend downward behind the ears of the user. The temples bias these flat tips inward against the head of the user to grip the head. This gripping together with nose pieces engaging the user's nose between the left and right eyeglass frame portions hold the spectacles in place. However often the temples become loose due to hinge wear or bending and thus fail to grip the opposite sides of the head resulting in the glasses tending to slip forward down the nose of the user. Additionally people wear glasses while playing sports, exercising or working under conditions where perspiration and/or the activity results in the glasses slipping or even falling from the head of the user.

As exemplified in U.S. Pat. No. 2,819,650, No. 2,914,769, No. 3,582,194 and No. 4,603,951, the prior art contains several retainers for holding spectacles on the head of the user. Typically these include some sort of elastic strap or band attached at opposite ends to the rear ends of the temples and extending around the back of the head of the user. One typical retainer includes adjustable loops which can be tightened around the ends of the temples; this type of retainer is generally cumbersome to attach and one of the loops can slip off of its temple end especially under conditions of heavy perspiration. Other retainers include provision of specially designed temples including one design wherein longitudinal bores are formed through the rear end portions of the temples for receiving a single strand elastic band threaded therethrough and secured at one end by an enlarged end of the band and at the other end by a loop secured by a clamp, and a second design wherein longitudinal slots are formed in the outer surface of the end portions of the temples to frictionally retain a single strand band with possible assistance by an engagement with a ball on the end received in a recess. These retainers employing specially designed temples generally require a substantial change and difficulty in temple manufacture and unduly degrade the aesthetic appearance of the spectacles.

SUMMARY OF INVENTION

An object of the invention is a reliable and inexpensive retainer for spectacles which can be easily employed in conventional spectacle design without unduly degrading the appearance of the spectacles.

Accordingly, the invention is summarized in a retainer for spectacles wherein slots are formed in depending flat plastic rear ends of temples extending horizontally through the flat cross section of the rear ends from front edges to central portions of the flat rear ends. The temples are hinged at their front ends on opposite sides of a double eyeglass frame. The slots receive and retain opposite end portions of an elastic band extending around the backside of the user's head to retain the spectacles on the user's head.

An advantage of the present invention is that relatively unobtrusive slots can be formed in conventional flat plastic

2 temple ends at relatively low cost during molding of the temple ends or later after manufacture.

Another advantage of the present invention is that a variety of endless loop or single strand bands ranging from common rubber bands to specially colored or transparent elastic bands may be employed in the present invention.

Additional features of the invention include the provision of slots with forward portions having reduced width relative to thickness of the elastic bands and the width of rear portions of the slots so as to retain the elastic bands within the slots; and the provision of beveled rear portions of the slots receiving the elastic bands so as to recess the elastic bands or enlarged portions thereof while reducing wear on the elastic bands as well as enhancing the retaining of the band within the slot.

Other objects, advantages and features of the invention will be apparent from the following description of the preferred embodiments taken in conjunction with the accompanying drawings.

BRIEF DESCRIPTION OF DRAWINGS

FIG. 1 is perspective view of spectacles including a retainer in accordance with one embodiment of the invention.

FIG. 2 is a enlarged side view of a broken-away rear tip portion of a temple of the spectacles of FIG. 1.

FIG. 3 is a cross-sectional view taken along line 3—3 in FIG. 2.

FIG. 4 is a perspective view illustrating employment of the spectacle retainer of FIG. 1.

FIG. 5 is a side view illustrating a second or standby position for retaining the employed spectacles of FIG. 4.

FIG. 6 is a view similar to FIG. 5 but of a third or rest spectacle position.

DESCRIPTION OF THE PREFERRED EMBODIMENTS

Figure 7:
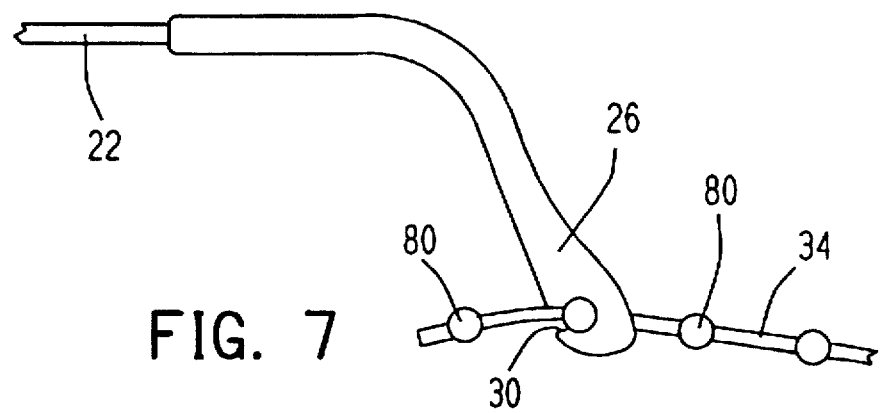
FIG. 7 is a side view of a temple portion with a second or adjustable variation of the elastic band.

As shown in FIG. 1, spectacles or eyeglasses employing a retainer in accordance with one embodiment of the invention includes a double eyeglass frame 20, a pair of temples 22 and 24 having forward ends hinged on respective left and right sides of the frame 20 and having depending flat plastic rear ends 26 and 28, horizontal slots 30 and 32 in the rear ends 26 and 28 extending rearward from front edges, and an elastic band 34 retained at opposite ends in the slots 30 and 32. The elastic band 34 can be readily engaged in the slots 30 and 32 and passed around the back of the users head, as shown in FIG. 4, to hold the spectacles in a correct position over the eyes of the user.

The frame 20 includes respective left and right frame portions 40 and 42 supporting respective lenses 44 and 46 for correcting the vision of the user and/or for protecting the eyes of the user against particles, hazardous materials or sunlight. A bridge 48 extends between upper inner corners of the frame portions 40 and 42 for connecting the frame portions into a spaced relationship on opposite sides of the nose of the user. Conventional nose pieces 49 can be formed integrally with or can be mounted on the inner lateral edges of the frame portions 40 and 42 for engaging the nose of the user to support the eyeglass frame in proper position in front of the eyes.

Hinge members 50 and 52 are mounted or formed integral at the left and right edges of the frame 20 for mating with corresponding hinge members 54 and 56 mounted or formed integral on the forward ends of the temples 22 and 24. The frame 20 and temples 22 and 24 can be formed from metal, molded plastic or a combination of metal and molded plastic. When formed from plastic, conventional metal reinforcement (not shown) may extend through portions of the frame 20 and/or temples 22. When spectacles are formed from metal, the rear flat ends of the temples are formed from molded plastic, such as shown in FIG. 7 for the molded plastic end 26 on the metal temple 22.

The plastic temple portions at the rear ends or tips 26 and 28 of the temples 22 and 24 are molded flat or strip-like for engaging inner flat surfaces against the skin of the user's head. The rear ends 26 and 28 depend downward with their smaller dimension normal to the user's skin. Normally the temples 22 and 24 are resilient and bias the flat surfaces of the rear ends 26 and 28 against the user's skin to hold the spectacles on the head of the user. However looseness in the hinge members 50, 52, 54 and 56, bending of the bridge 48 of the frame 20 and/or bending of the temples 22 and 24 often results in loss of gripping force of the temple ends 26 and 28 against the user's head. This permits the nose pieces of the spectacles to slide forward and down the nose of the user. Additionally perspiration of the user can lessen the gripping force between the temple ends and the user's head. Also newer "flex" eyeglass frame materials can exhibit excessive looseness.

The slots 30 and 32 in the depending rear ends 26 and 28 of the temples are formed generally horizontally completely through the narrow dimension of the flat temple ends or normal to the users skin. The slots 30 and 32 extend from the front edges of the respective temple ends to center portions of the temple ends. As shown in detail in FIGS. 2 and 3 for the slot 30 on one side, each of the slots has a forward portion 60 which has a width (vertical dimension) 62 which is narrower than the width (vertical dimension) 64 of the rear portion 66 of the slot 30 terminating within the central portion of the temple end 26. Conveniently, the width 62 of the forward portion 60 of the slot 30 is less than the normal thickness of the portion of the elastic band 34 received in the slot 30 so that the elastic band 34 is retained in the enlarged portion even when rearward tension of the band is absent.

Additionally, the edges on the opposite sides of the central portion 66 are beveled so as to form countersinks 70 and 72. This tends to reduce the sharpness of the edges of temple ends engaging the elastic band to decrease wear and tear of the elastic band and to recess a holding ball or knot to increase holding force along with decreasing visibility of such ball or knot. Additionally the thickness of the elastic band can be greater than the width 64 so that the elastic band is compressed within the center portion 66. The bevels 70 and 72 result in a horizontal width 74 of the central slot portion 66 which is about one-half to three-fourths of the thickness (horizontal width) of the temple end 26 which in turn is about equal to the horizontal width of the front slot portion 60. Thus the length of the elastic band that is compressed within the central slot portion 66 is substantially less than the length of the band that must be compressed to exit through the front slot portion 60. The compression of the band 34 within the rear portion 66 of the slots produces shoulders 75 (shown in phantom in FIG. 3) on the band interlocking with the countersinks 70 and 72 to further increase the retaining force for holding the elastic band 34 in the slots 30 and 32.

Figure 8:
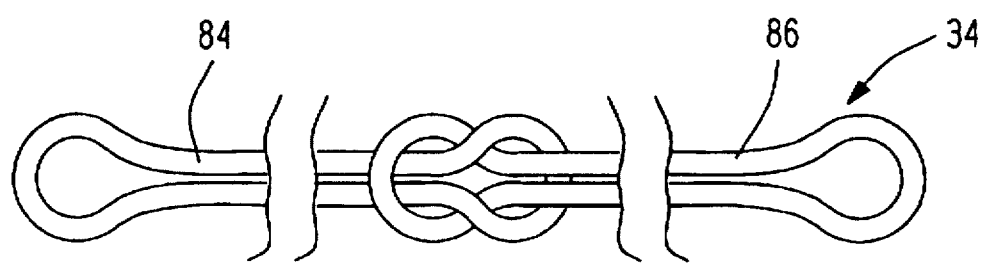
FIG. 8 is a plan view with portions broken away of a third variation of the elastic band.
Figure 9:
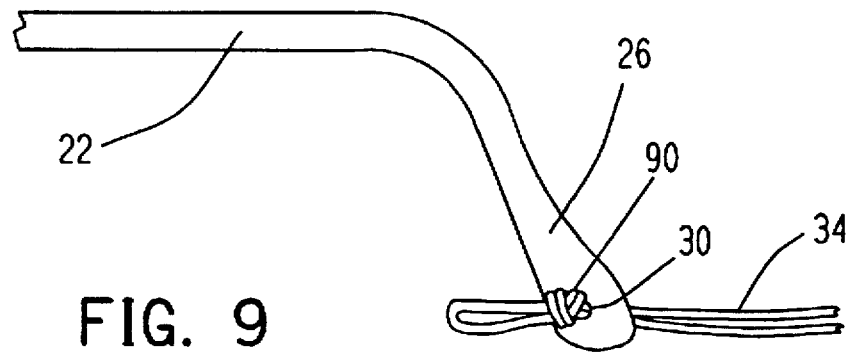
FIG. 9 is a plan view with a portion broken away of a fourth variation of the elastic band.
Figure 10:
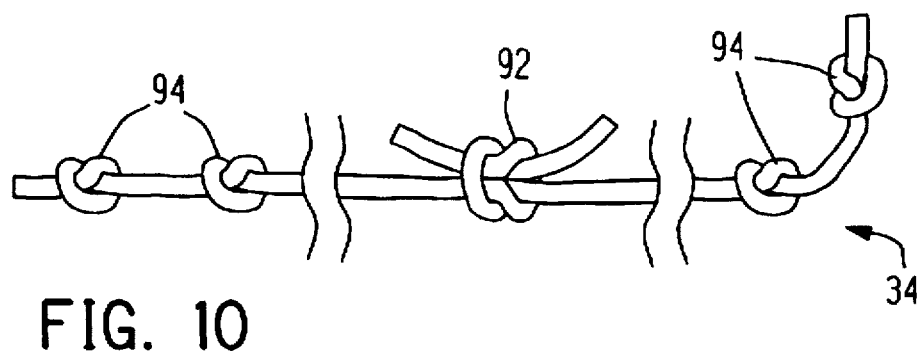
FIG. 10 is a plan view with portions broken away of a fifth variation of the elastic band.

The elastic band 34 is any relative thin band of rubber or other highly elastic polymer. The cross section of the band can be round, square, rectangular, oblong, or other configuration. As shown in FIG. 1, the band 34 can be a single continuous looped band which is folded together to form opposite ends which are engaged by passing through the slots 30 and 32. As shown in FIG. 7, the band 34 can be a single strand and have beads 80 spaced along its end portions for engaging the slots such as shown for the 30; this beaded single strand has the advantage that the length of the band 34 extending between the temple end portions can be readily adjusted by engaging different beads in the slots. In FIG. 8, the band 34 is shown as being formed from a pair of bands 84 and 86 which are intertwined or knotted together. In FIG. 9, a folded continuous band 34 has a knot such as a half knot 90 formed to engage the slot 30 and thus shorten the length of the band. In FIG. 10, two single strand bands are joined by a square knot 92 and have half knots 94 formed at the unjoined ends for engaging the slots 30 and 32 of the temples; a plurality of knots 94 at each end provide for adjustment of the retaining tension on the head of the wearer.

An adjustable band 34 or selection of a band from various length bands 34 permits subtle variations in the positioning or tensioning of the spectacles on the users' face. By selecting the length of the band the user can select the tension, the angle or the position that the spectacles are held on the nose of the user. Similarly the position of the band 34 on the back of the head can be adjusted by the user raising or lowering the band on the back of the head to provide small changes in the tension, angle and position of the spectacles on the nose of the user.

FIGS. 5 and 6 illustrate that the present retainer with the band 34 can be used to hold the spectacles in different positions. In FIG. 5 the spectacles are retained on the forehead above the eyes of the user such as in a standby position while using binoculars, a microscope, a camera, or otherwise momentarily foregoing spectacle use. In FIG. 6, the spectacles are retained about the neck of the user with the spectacles dangling on the user's chest in a rest or storage position while use of the spectacles is not needed.

Similarly the band 34 can be used to hang the spectacles on a hook or a nail when not in use.

Since many variations, modifications and changes in detail may be made to the above described embodiments without departing from the scope and spirit of the invention, it is intended that the above description be interpreted as only illustrative and not in a limiting sense.

What is claimed is:

1. A retainer for spectacles having a double eyeglass frame, comprising a pair of temples having front ends for being pivotally to attached opposite sides of the eyeglass frame and having rear ends depending downward for extending back of ears of a user of the spectacles;

said depending rear ends each having flat plastic tips for extending parallel to and engaging the skin on the user's head back of the user's ears;

said flat tips each having a slot formed therein extending horizontally through the flat cross section of the respective tip from a front edge to a central portion of the flat tip; and an elastic band having end portions for being received and retained in the respective slots of the flat tips while extending on the backside of the user's head to retain the spectacles on the user's head.

2. A retainer as claimed in claim 1 wherein each of the slots has a forward portion with an opening width less than a thickness of the elastic band, and has a rear portion with an opening width enlarged relative to the forward portion for receiving the elastic band so as to retain the elastic band in the enlarged rear portion of each slot.

3. A retainer as claimed in claim 1 wherein the flat tips include countersinks formed within the central portions of the tips around the rear portions of the slots.

4. A retainer as claimed in claim 2 wherein the flat tips include countersinks formed within the central portions of the tips around the rear portions of the slots.

5. A retainer as claimed in claim 1 wherein the elastic band is a continuous band having looped end portions which are received and retained in the respective slots and which extend through the slot and around the rear portion of the tips.

6. A retainer as claimed in claim 1 wherein the elastic band has enlarged members on its opposite end portions for engaging outer edges of tips at the slots to prevent the ends of the elastic band from slipping through the slot.

7. A retainer as claimed in claim 4 wherein each end portion of the elastic band has a plurality of spaced enlarged members for enabling selection of the tension of the elastic band on the backside of the user's head.

8. A retainer as claimed in claim 1 wherein the slots in the flat tips of the temples are suitable for receiving and retaining an ordinary rubber band as the elastic band.

9. A retainer as claimed in claim 9 wherein the elastic band is an ordinary rubber band having knots therein for determining the length of the elastic band.

10. A retainer as claimed in claim 4 wherein the opening width of the rear portion of each of the slots is less than the thickness of the elastic band so that the elastic band interlocks with the countersinks to assist in retention of the band within the slots.

* * * * *